(12) United States Patent
Hata et al.

(10) Patent No.: US 9,651,288 B2
(45) Date of Patent: May 16, 2017

(54) REFRIGERATION APPARATUS AND REFRIGERATION CYCLE APPARATUS

(75) Inventors: Kenichi Hata, Tokyo (JP); Hiroshi Sata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 449 days.

(21) Appl. No.: 14/381,642

(22) PCT Filed: Mar. 30, 2012

(86) PCT No.: PCT/JP2012/002238
§ 371 (c)(1),
(2), (4) Date: Aug. 28, 2014

(87) PCT Pub. No.: WO2013/145027
PCT Pub. Date: Oct. 3, 2013

(65) Prior Publication Data
US 2015/0052925 A1    Feb. 26, 2015

(51) Int. Cl.
*F25B 49/02* (2006.01)
*F25B 1/10* (2006.01)
*F25B 41/04* (2006.01)

(52) U.S. Cl.
CPC .............. *F25B 49/022* (2013.01); *F25B 1/10* (2013.01); *F25B 41/04* (2013.01);
(Continued)

(58) Field of Classification Search
CPC ...... F25B 49/022; F25B 1/10; F25B 2400/04; F25B 2400/13; F25B 2600/0261; F25B 2600/25; F25B 2600/027; Y02B 30/741
See application file for complete search history.

(56) References Cited

U.S. PATENT DOCUMENTS

| 6,293,123 B1 * | 9/2001 | Iritani | .................. B60H 1/3205 |
| | | | 62/197 |
| 6,347,528 B1 * | 2/2002 | Iritani | ................ B60H 1/00357 |
| | | | 62/323.1 |

(Continued)

FOREIGN PATENT DOCUMENTS

JP    H01-210761 A    8/1989
JP    H05-340615 A    12/1993

(Continued)

OTHER PUBLICATIONS

Office Action issued Dec. 8, 2015 in the corresponding JP application No. 2014-507018 (with English translation).

(Continued)

*Primary Examiner* — Ljiljana Ciric
(74) *Attorney, Agent, or Firm* — Posz Law Group, PLC (57) ABSTRACT

A refrigeration apparatus includes a compressor receiving refrigerant through an injection pipe and of discharging the refrigerant, a condenser, an electronic expansion valve connected by piping to another end of the injection pipe, a subcooling coil, a solenoid valve configured to control inflowing of the refrigerant through the injection pipe into the compressor, an injection bypass pipe connecting the injection pipe and a pipe on a suction side of the compressor, a solenoid valve configured to control passage of the refrigerant flowing through the injection bypass pipe, a high-low pressure bypass pipe connecting a pipe on a discharge side of the compressor and the pipe on the suction side of the compressor, a solenoid valve configured to control passage of the refrigerant through the high-low pressure bypass pipe, and a controller configured to control a frequency of the compressor and opening and closing of each of the solenoid valves.

11 Claims, 4 Drawing Sheets

(52) U.S. Cl.
CPC ..... *F25B 2400/13* (2013.01); *F25B 2600/027* (2013.01); *F25B 2600/0253* (2013.01); *F25B 2600/0261* (2013.01); *F25B 2600/25* (2013.01); *Y02B 30/741* (2013.01)

(56) References Cited

U.S. PATENT DOCUMENTS

| | | | | |
|---|---|---|---|---|
| 7,805,961 | B2* | 10/2010 | Choi | F25B 13/00 62/324.6 |
| 8,109,111 | B2* | 2/2012 | Yamada | F25B 13/00 62/324.1 |
| 2005/0115271 | A1* | 6/2005 | Takegami | F25B 13/00 62/498 |
| 2006/0123835 | A1* | 6/2006 | Takegami | F25B 13/00 62/498 |
| 2006/0266058 | A1* | 11/2006 | Nemoto | F25B 9/002 62/183 |
| 2007/0234753 | A1* | 10/2007 | Nemoto | F25B 25/005 62/335 |
| 2008/0229782 | A1* | 9/2008 | Takegami | F25B 7/00 62/513 |
| 2012/0266622 | A1* | 10/2012 | Inaba | B60H 1/00899 62/186 |
| 2015/0267957 | A1* | 9/2015 | Kim | F25B 47/025 62/81 |

FOREIGN PATENT DOCUMENTS

| | | |
|---|---|---|
| JP | H06-265223 A | 9/1994 |
| JP | H06-323647 A | 11/1994 |
| JP | 2008-138923 A | 6/2008 |
| JP | 2008-180420 A | 8/2008 |
| JP | 2010-139205 A | 6/2010 |

OTHER PUBLICATIONS

International Search Report of the International Searching Authority mailed May 29, 2012 for the corresponding international application No. PCT/JP2012/002238 (and English translation).

Office Action issued Sep. 11, 2015 in the corresponding CN application No. 201280072031.7 (with English translation).

\* cited by examiner

REFRIGERATION APPARATUS AND REFRIGERATION CYCLE APPARATUS

CROSS REFERENCE TO RELATED APPLICATION

This application is a U.S. national stage application of International Application No. PCT/JP2012/002238 filed on Mar. 30, 2012, the disclosure of which is incorporated by reference.

TECHNICAL FIELD

The present invention relates to a refrigeration apparatus and the like including a compressor capable of performing an injection.

BACKGROUND ART

A refrigeration cycle apparatus has been proposed that reduces a pressure difference between a high-pressure side (discharge side) and a low-pressure side (suction side) of a compressor before activating the compressor to reduce an activating load of the compressor (see, for example, Patent Literature 1). For example, a fan for a condenser is rotated for a certain period of time before the compressor starts its operating after recovery of a low-pressure switch on the basis of a pressure difference between a high-pressure side and a low-pressure side of the compressor, thereby reducing the pressure on the high-pressure side. After that, a bypass pipe that connects the high-pressure side and the low-pressure side of the compressor is opened for a certain period of time to make the pressure on the high-pressure side escape to the low-pressure side, and then, the compressor is activated.

There is also proposed a refrigeration cycle apparatus that prevents liquid compression in activating a compressor capable of receiving an injected liquid to suppress an increase in the temperature of a discharged gas (see, for example, Patent Literature 2).

CITATION LIST

Patent Literature

Patent Literature 1: Japanese Unexamined Patent Application Publication No. 6-323647 (FIG. 1)
Patent Literature 2: Japanese Unexamined Patent Application Publication No. 5-340615 (FIG. 1)

SUMMARY OF INVENTION

Technical Problem

A refrigeration cycle apparatus that uses a compressor employing a method of receiving a refrigerant injected into an intermediate pressure unit is advantageous in that refrigeration capacity increases when the apparatus has a structure in which a double-pipe coil or the like is included and supercooling of the refrigerant is enabled. However, because the refrigerant is directly injected into the intermediate pressure unit in the compressor, if the refrigerant being in liquid state is introduced, liquid compression may occur. This may lead to a cause of failures in activating the compressor, and may raise a problem in the quality of the compressor.

In reactivating the compressor in the refrigeration cycle apparatus, liquid refrigerant may return from an evaporator. To avoid such a liquid refrigerant return, a pump-down operation is performed before the compressor is stopped, and the compressor is stopped after the refrigerant is retained in a liquid reservoir on the high-pressure side. In that case, because the refrigerant is retained on the high-pressure side, pressure differential activation will occur.

The present invention is made to solve the above-described problems and is directed to obtain a refrigeration apparatus and the like capable of activating a compressor with stability.

Solution to Problem

A refrigeration apparatus according to the present invention includes a compressor connected to an end of an injection pipe and capable of receiving a flow of refrigerant through the injection pipe in an intermediate section in a compression stroke and of discharging the refrigerant, a heat source side heat exchanger configured to exchange heat between outside air and the refrigerant, an expansion device connected by piping to another end of the injection pipe and configured to reduce a pressure of a portion of the refrigerant flowing from the heat source side heat exchanger, a supercooling device configured to supercool the refrigerant flowing from the heat source side heat exchanger using the refrigerant having passed through the expansion device, a first flow opening and closing device configured to control inflowing of the refrigerant flowing through the injection pipe into the compressor, an injection bypass pipe connecting the injection pipe and a pipe on a suction side of the compressor, a second flow opening and closing device configured to control passage of the refrigerant through the injection bypass pipe, a high-low pressure bypass pipe connecting a pipe on a discharge side of the compressor and the pipe on the suction side of the compressor, a third flow opening and closing device configured to control passage of the refrigerant through the high-low pressure bypass pipe, and a controller configured to control a frequency of the compressor and opening and closing of each of the first flow opening and closing device, the second flow opening and closing device, and the third flow opening and closing device.

Advantageous Effects of Invention

The refrigeration apparatus according to the present invention can prevent pressure differential activation of a compressor, liquid compression, and the like and can improve the activation performance (in normal activation and in activation after stopping by low-pressure cutoff).

DESCRIPTION OF EMBODIMENTS

Embodiment 1

An embodiment of the present invention is described below on the basis of the drawings.

Figure 1:
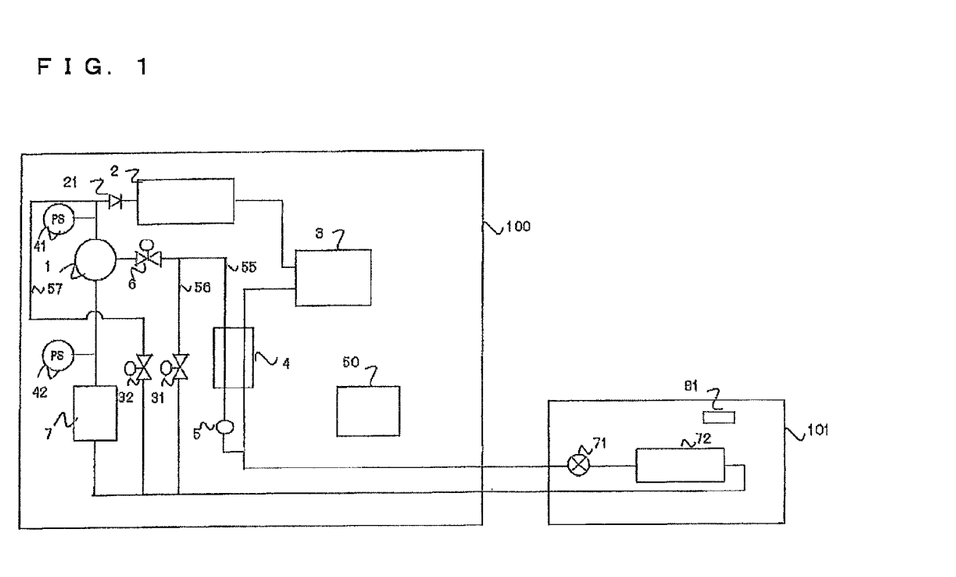
FIG. 1 is a schematic diagram that illustrates an example configuration of a refrigeration cycle apparatus including a refrigeration apparatus 100 according to Embodiment 1 of the present invention as its center.

FIG. 1 is a schematic diagram that illustrates an example configuration of a refrigeration cycle apparatus including a refrigeration apparatus 100 according to Embodiment 1 of the present invention as its center. A configuration and operations of the refrigeration apparatus 100 and the like are described with reference to FIG. 1. In the drawings below, including FIG. 1, relationships among the sizes of elements may be different from actual ones. In the drawings below, including FIG. 1, the same reference numerals indicate the same or corresponding elements, and this applies throughout the present specification. In addition, the forms of the elements described throughout the present specification are merely illustrative, and the present invention is not limited to the description. High, low, and the like in temperature, pressure, and the like are not defined by relations to specific values but are defined relatively according to a state, an operation, and the like in a system, an apparatus, and the like.

A refrigeration cycle apparatus according to Embodiment 1 includes the refrigeration apparatus (heat source side apparatus) 100 and a load side apparatus 101. The refrigeration apparatus 100 and the load side apparatus 101 are connected to each other by refrigerant pipes and constitute a refrigerant circuit through which a refrigerant circulates.

The refrigeration apparatus 100 according to Embodiment 1 achieves injection control and high-pressure suppression control capable of reducing failures in activating a compressor 1. The refrigeration apparatus 100 can be used in, for example, a refrigerator, a freezer, an air-conditioning apparatus, an outdoor unit in a showcase and the like, a chiller, a water heater, and the like.

[Configuration of Refrigeration Apparatus 100 (Main Refrigerant Circuit)]

The refrigeration apparatus 100 includes the inverter compressor 1 including an inverter circuit (hereinafter referred to as compressor 1) and a condenser 2 (heat source side heat exchanger) configured to exchange heat of a discharged gas from the compressor 1 with air and condense the refrigerant. The refrigeration apparatus 100 further includes a check valve 21 arranged on a pipe unit connecting the compressor 1 and the condenser 2, a liquid reservoir 3 for storing a liquid refrigerant flowing out of the condenser 2, and a subcooling coil 4 serving as a supercooling device for supercooling the liquid refrigerant flowing out of the liquid reservoir 3. The refrigeration apparatus 100 also includes an accumulator 7 connected by a pipe on the suction side of the compressor 1 and configured to separate the refrigerant returned from the load side apparatus 101 into gas and liquid. These devices are connected by refrigerant pipes and constitute a part (heat source side circuit) of a fundamental refrigerant circuit (main refrigerant circuit).

[Configuration of Load Side Apparatus 101]

The load side apparatus 101 includes at least an expansion valve 71 serving as flow control means for reducing a pressure of a refrigerant and a cooler 72 serving as a load side heat exchanger for exchanging heat between the refrigerant with the reduced pressure and, for example, air being a target for cooling and for causing the refrigerant to evaporate. These devices are connected together by refrigerant pipes, constitute a part (load side circuit) of the fundamental refrigerant circuit, and is connected to a heat source side circuit in the refrigeration apparatus 100.

[Configuration of Refrigeration Apparatus 100 (Injection Circuit)]

The refrigerant circuit in the refrigeration apparatus 100 includes an injection circuit 55 including an injection pipe that branches in a location downstream of the subcooling coil 4 in the heat source side circuit and that is connected to an intermediate pressure unit (intermediate port) in the compressor 1. The refrigeration apparatus 100 further includes an injection bypass circuit 56 (hereinafter referred to as bypass circuit 56) including an injection bypass pipe that connects a pipe between the subcooling coil 4 in the injection circuit 55 and the compressor 1 and a pipe between the load side apparatus 101 and the accumulator 7. The refrigeration apparatus 100 further includes an electronic expansion valve 5 disposed on the inflow side of the subcooling coil 4 in the injection circuit 55. The refrigeration apparatus 100 further includes a solenoid valve 31 serving as a second flow opening and closing device and disposed in the bypass circuit 56. The refrigeration apparatus 100 further includes a solenoid valve 6 serving as a first flow opening and closing device and disposed between the compressor 1 and a branch point the branches to the bypass circuit 56 in the injection circuit 55.

[Configuration of Refrigeration Apparatus 100 (High-Low Pressure Bypass Circuit)]

The refrigeration apparatus 100 further includes a high-low pressure bypass circuit 57 (hereinafter referred to as bypass circuit 57) connecting a pipe between the compressor 1 and the check valve 21 and a pipe between the load side apparatus 101 and the accumulator 7 using a high-low pressure bypass pipe. The refrigeration apparatus 100 further includes a solenoid valve 32 serving as a third flow opening and closing device and disposed in the bypass circuit 57.

[Compressor 1]

The compressor 1 is configured to compress a refrigerant to a high-temperature and high-pressure state and discharge it. The compressor 1 according to Embodiment 1 has a structure in which a refrigerant flowing through the injection circuit 55 can be injected into the intermediate pressure unit in the compressor 1. As previously described, the compressor 1 is of the capacity control type capable of controlling its rotation speed by an inverter circuit. The compressor 1 may use any compression method selected from among rotary method, screw method, reciprocating method, and scroll method.

[Check Valve 21]

The check valve 21 prevents backflow of a refrigerant from the condenser 2 to the bypass circuit 57 and suppresses the amount of the refrigerant flowing through the bypass circuit 57. The check valve 21 is used for suppressing the amount of movement of the refrigerant and thus may not be disposed. Even in that case, an advantageous effect of improving the activation performance in the present invention is also obtainable.

[Elements in Main Refrigerant Circuit]

The condenser 2 exchanges heat between a discharged refrigerant from the compressor 1 and a heat medium, such as air or water, and condenses and liquefies the refrigerant. The liquid reservoir (receiver) 3 is disposed between the condenser 2 and the subcooling coil 4 in the heat source side circuit (main refrigerant circuit) and stores a refrigerant flowing out of the condenser 2. The subcooling coil 4 can be a double-tube coil, for example, and exchanges heat between a flow of refrigerant out of the liquid reservoir 3 and flow of a refrigerant through the injection circuit 55. The accumulator 7 is disposed on the suction side of the compressor 1, separates a refrigerant into gas and liquid, and accumulates a redundant refrigerant.

[Elements in Injection Circuit 55]

The electronic expansion valve 5 reduces the pressure of a refrigerant flowing through the injection circuit 55 and expands it. The electronic expansion valve 5 can reducing adjustment of the pressure by changing its opening degree. The solenoid valve 6 controls passage of the refrigerant to the injection circuit 55 by being electromagnetically opened or closed. When the solenoid valve 6 is opened, the refrigerant is injected into the compressor 1; when the solenoid valve 6 is closed, the refrigerant is not injected. The solenoid valve 31 controls passage of the refrigerant to the bypass circuit 56 by being electromagnetically opened or closed. When the solenoid valve 31 is opened, the refrigerant flows into the bypass circuit 56; when the solenoid valve is closed, the refrigerant does not flow thereinto.

[Element in Bypass Circuit 57]

The solenoid valve 32 controls passage of a refrigerant to the bypass circuit 57 by being electromagnetically opened or closed. When the solenoid valve 32 is opened, the refrigerant flows into the bypass circuit 57; when the solenoid valve is closed, the refrigerant does not flow thereinto.

[Controller 50]

Figure 2:
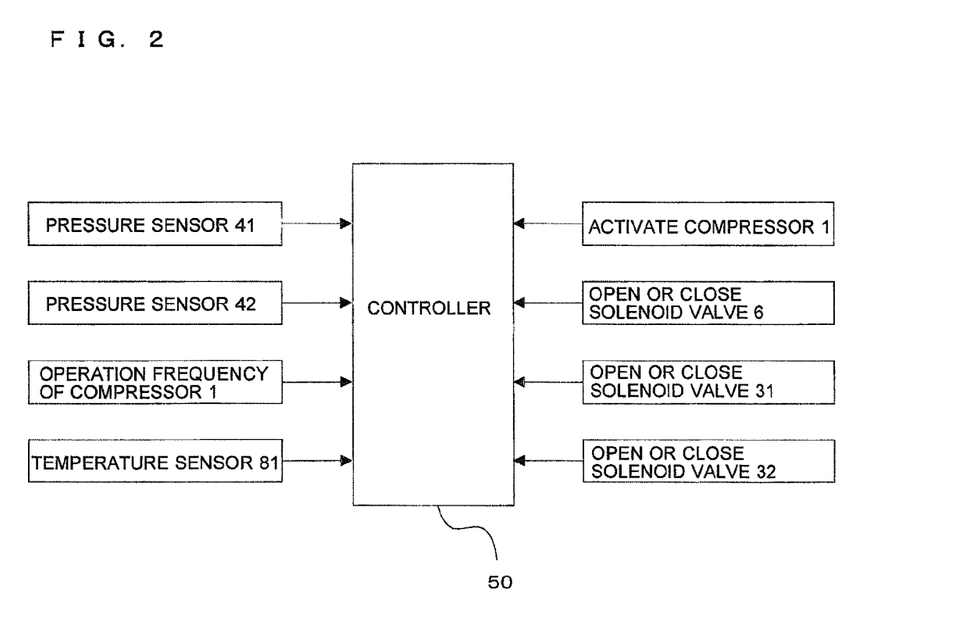
FIG. 2 illustrates relationships between inputs and outputs of signals in a controller 50 according to Embodiment 1 of the present invention.

FIG. 2 illustrates relationships between inputs and outputs of signals in the controller 50 according to Embodiment 1 of the present invention. The refrigeration apparatus 100 is equipped with the controller 50 including a microcomputer and the like for exercising control over the refrigeration cycle apparatus. The controller 50 can receive, for example, pressures relating to detection by pressure sensors 41 and 42, an operation frequency of the compressor 1, a temperature relating to detection by a temperature sensor 81, and the like. The controller 50 can output, for example, signals for controlling a driving frequency of the compressor 1, controlling an opening degree of the electronic expansion valve 5, controlling opening and closing of each of the solenoid valves 6, 31, and 32, and the like to devices. The controller 50 controls the above-described actuators (for example, the compressor 1, the electronic expansion valve 5, the solenoid valves 6, 31, and 32, and the like) and causes them to execute the operations described below.

The pressure sensor 41 is pressure detecting means for detecting a pressure on the discharge side of the compressor 1 (high-pressure side in the refrigerant circuit). The pressure sensor 42 is pressure detecting means for detecting a pressure on the suction side of the compressor 1 (low-pressure side in the refrigerant circuit). The temperature sensor 81 is temperature detecting means for detecting a temperature in the vicinity of the location of the load side apparatus 101.

[Flow of Refrigerant in Basic Operation of Refrigeration Apparatus 100 and the Like]

Next, a flow of a refrigerant in the refrigeration cycle apparatus in a basic operation is described. A high-temperature and high-pressure gas refrigerant compressed and discharged by the compressor 1 flows into the condenser 2. In the condenser 2, the gas refrigerant is made to be a high-pressure liquid refrigerant by rejecting heat by exchanging heat with a heat medium supplied to the condenser 2, and the liquid refrigerant flows out of the condenser 2. The high-pressure liquid refrigerant flowing out of the condenser 2 flows into the liquid reservoir 3. The refrigerant flowing out of the liquid reservoir 3 flows into the subcooling coil 4. If a refrigerant is flowing through the injection circuit 55, this refrigerant exchanges heat with the refrigerant from the liquid reservoir 3 and the refrigerant from the liquid reservoir 3 is supercooled. The refrigerant flows out of the subcooling coil 4 and is then used in the load side apparatus 101. After that, then the refrigerant is sucked in the compressor 1 again through the accumulator 7. In the load side apparatus 101, the pressure of the refrigerant is reduced in the expansion valve 71 used for reducing the pressure of the refrigerant, the refrigerant with the reduced pressure evaporates in the cooler 72, the refrigerant becomes a gas refrigerant and a two-phase gas-liquid refrigerant, and they flow into the refrigeration apparatus 100.

[Flow in Injection Circuit 55 and Bypass Circuits 56 and 57]

The liquid refrigerant flowing out of the subcooling coil 4 is split into a component that can be directed to the load side apparatus 101 and another component that can be directed to the injection circuit 55. The refrigerant flowing into the injection circuit 55 is subjected to pressure reduction by the electronic expansion valve 5 and exchanges heat with the liquid refrigerant flowing out of the liquid reservoir 3 in the subcooling coil 4. As previously described, the refrigerant flowing out of the liquid reservoir 3 is supercooled. After that, the refrigerant passes through the solenoid valve 6 and is then injected into the compression chamber through the intermediate port in the compressor 1.

The flow of the refrigerant through the injection circuit 55 may also be routed to the suction side of the compressor 1 (upstream side of the accumulator 7) through the bypass circuit 56. Routing the refrigerant to the suction side of the compressor 1 through the bypass circuit 56 may be referred to as "suction injection." When the compressor 1 is inactive, each of the solenoid valves 6 and 31 is in a closed state.

Flowing of the refrigerant into the bypass circuit 57 is determined by the opening or closing of the solenoid valve 32. The amount of the refrigerant flowing into the bypass circuit 57 is minimized by the check valve 21. In the refrigeration apparatus 100, the opening and closing of the solenoid valves 6, 31, and 32 can be controlled at optimal timings by the controller 50.

[Timings of Opening and Closing of Solenoid Valves 6, 31, and 32 in Activation and the Like of Compressor 1]

Figure 3:
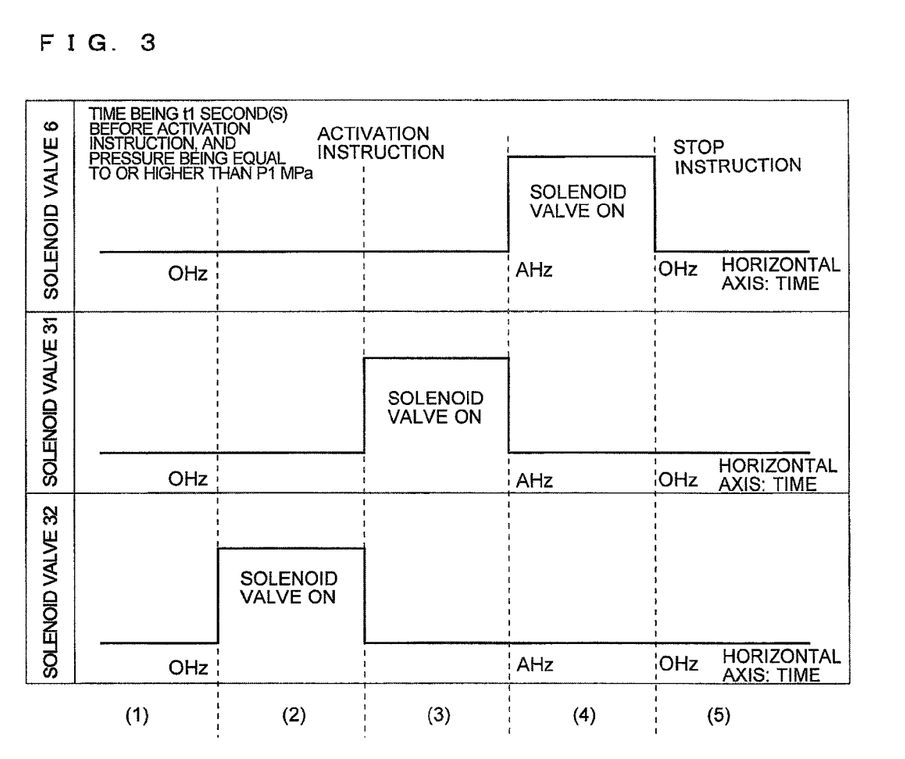
FIG. 3 is an illustration for describing timings of opening and closing solenoid valves 6, 31, and 32 in the refrigeration apparatus 100.

FIG. 3 is an illustration for describing timings of opening and closing the solenoid valves 6, 31, and 32 in the refrigeration apparatus 100. Control of the opening and closing of the solenoid valves by the controller 50 is described with reference to FIG. 3. Here, in the refrigerant circuit in Embodiment 1, an operation including an injection into the compressor 1 is performed as a normal operation.

First, when the compressor 1 is inactive, each of the solenoid valves 6, 31, and 32 is in a closed state ((1) in FIG. 3). Thus a high-pressure refrigerant discharged from the compressor 1 remains on the downstream side (discharge side) of the compressor 1. If the compressor 1 is activated in that state, the activation is with pressure difference, the torque acting on the compressor 1 is large, and an overcurrent occurs. To avoid that situation, the controller 50 in the refrigeration apparatus 100 opens the solenoid valve 32 before providing an instruction to activate the compressor 1. Here, the opening or closing of the solenoid valve 32 can be determined on the basis of a pressure relating to detection by the pressure sensor 41 ((2) in FIG. 3). If no pressure detected by the pressure sensor 41 is used in determination of the opening or closing of the solenoid valve 32, such as if the pressure sensor 41 is not disposed, the solenoid valve 32 is opened before an instruction to activate the compressor 1, irrespective of the magnitude of the pressure on the downstream side of the compressor 1.

The electronic expansion valve 5 is not fully closed, and thus an intermediate-pressure liquid refrigerant remains in the injection circuit 55. One example reason why the electronic expansion valve 5 is not fully closed is extension of the life of the electronic expansion valve 5. If the compressor 1 is activated in that state and a liquid refrigerant is injected, liquid compression occurs, the torque increases, and an overcurrent occurs. To avoid that situation, the refrigeration apparatus 100 (controller 50) closes the solenoid valve 6 until after the compressor 1 is activated, the operation frequency of the compressor 1 reaches a predetermined frequency, thus preventing the liquid refrigerant from flowing into the intermediate port in the compressor 1. Accordingly, the liquid compression does not occur in activating the compressor 1.

In addition, the solenoid valve 31 is opened until after the compressor 1 is activated, the operation frequency of the compressor 1 reaches the predetermined frequency. Thus the liquid refrigerant inside the injection circuit 55 can be ejected to the suction side of the compressor 1, and preparation for starting injection can be made ((3) in FIG. 3). Accordingly, when the compressor 1 reaches the predetermined frequency and injection to the compressor 1 starts, a normal operation can continue without causing liquid compression resulting from inflowing of the liquid refrigerant ((4) in FIG. 3).

Simultaneously with stopping of the compressor 1, the solenoid valves 6, 31, and 32 are closed ((5) in FIG. 3).

As described above, the refrigeration apparatus 100 can achieve control for suppressing activation with pressure difference and injection control capable of reducing failures in activating the compressor 1. Thus the refrigeration apparatus 100 can operate continuously and smoothly from activation of the compressor 1 to a normal operation of the compressor 1.

[Control of Opening and Closing of Solenoid Valves 6, 31, and 32 in Activation and the Like of Compressor 1]

Figure 4:
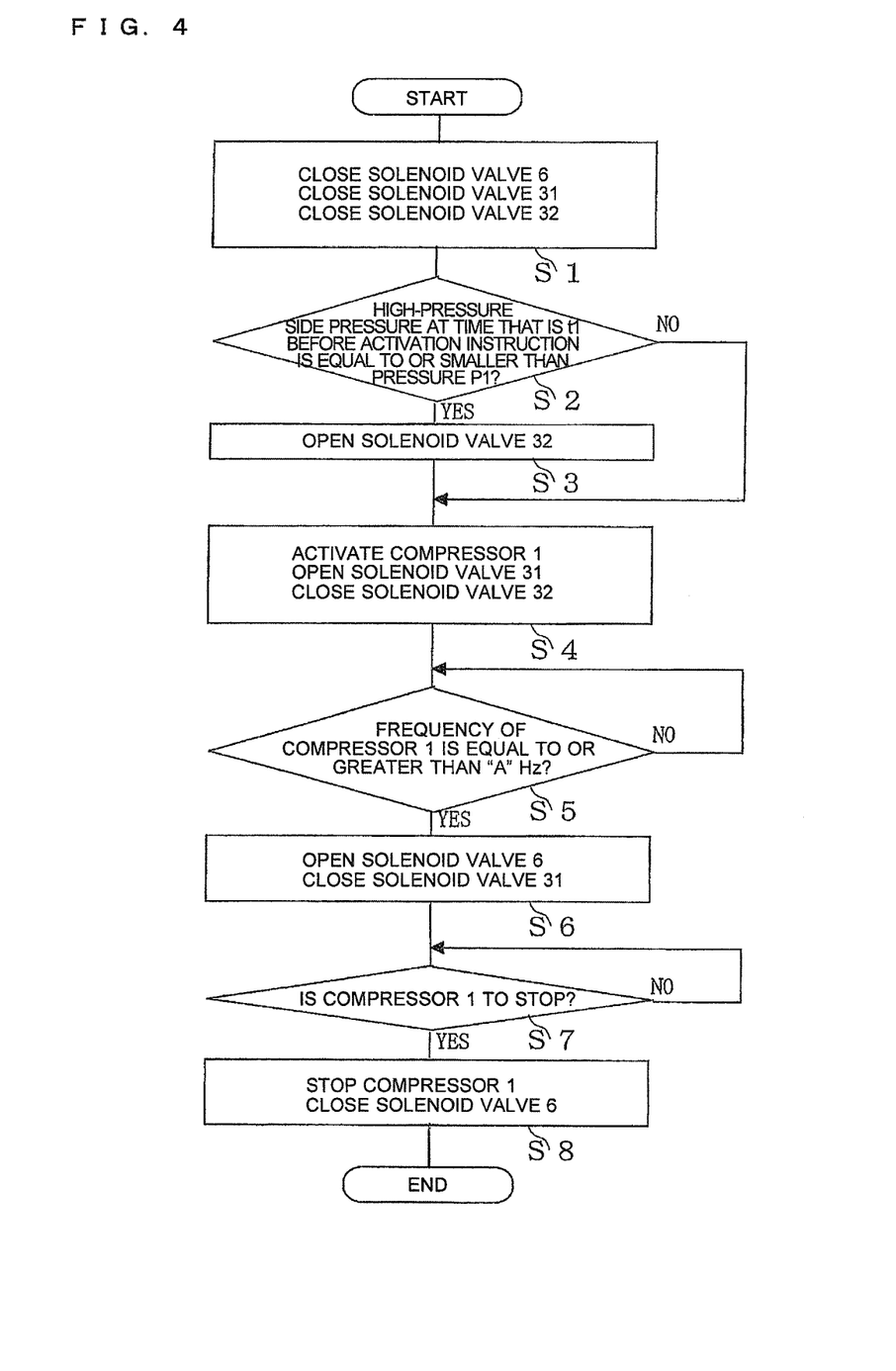
FIG. 4 is a flowchart of a process for activating and stopping a compressor 1 and for controlling the opening and closing of the solenoid valves 6, 31, and 32 in the refrigeration apparatus 100.

FIG. 4 is a flowchart of a process for activating and stopping the compressor 1 and for controlling the opening and closing of the solenoid valves 6, 31, and 32 in the refrigeration apparatus 100. The processing relating to the controlling of the opening and closing of the solenoid valves 6, 31, and 32 by the controller 50 is described below with reference to FIG. 4 and the like.

[Opened and Closed States of Solenoid Valves 6, 31, and 32 when Compressor 1 is Inactive]

As previously described, when the compressor 1 is inactive, each of the solenoid valves 6, 31, and 32 is in a closed state (S1).

[Operating Condition for Solenoid Valve 32]

For example, when a user or the like provides an instruction to operate the refrigeration cycle apparatus, the controller 50 does not promptly send an instruction to activate the compressor 1, but sends the activation instruction after time t1 (for example, five seconds). The time t1 is determined in consideration of time required to open the solenoid valve 32. Thus it is determined whether a high-pressure pressure (pressure on the discharge side of the compressor 1, pressure detected by the pressure sensor 41) the time t1 before the instruction to activate the compressor 1 is sent is equal to or higher than pressure P1 (for example, equal to or higher than 2.2 MPa) (S2). When it is determined that the pressure is equal to or higher than the pressure P1, the solenoid valve 32 is opened (S3). In contrast, when it is determined that the pressure is lower than the pressure P1 Mpa, the solenoid valve 32 remains in the closed state. As previously described, if the determination of the opening or closing of the solenoid valve 32 is not based on a pressure detected by a pressure sensor, the solenoid valve 32 is opened.

[Operation Condition for Solenoid Valves 31 and 32]

In activating the compressor 1, the solenoid valve 32 is closed, and the solenoid valve 31 is opened (S4). If the solenoid valve 32 is in the closed state in activating the compressor 1, the closed state remains. The timing for changing the closed state to the opened state of the solenoid valve 31 and the timing for changing the opened state to the closed state of the solenoid valve 32 may be any of the timing immediately before the compressor 1 is activated, the timing simultaneously with the activating, and the timing immediately after the activating. In any case, the same advantageous effect of improving the activation performance is obtainable.

[Operation Condition for Solenoid Valves 6 and 31]

After the compressor 1 is activated, it is determined whether the operation frequency of the compressor 1 is equal to or higher than A Hz (for example, equal to or higher than 30 Hz) (S5). When it is determined that the operation frequency is equal to or higher than the A Hz, the solenoid valve 31 is closed, the solenoid valve 6 is opened, and a normal operation of the compressor 1 (injection) starts (S6). The timing for changing the closed state to the opened state of the solenoid valve 6 may be any of timings immediately before, simultaneously with, and immediately after the solenoid valve 31 is changed from the opened state to the closed state. In any case, the same advantageous effect of improving the activation performance is obtainable.

Then, it is determined whether the compressor 1 is to be stopped (S7). When it is determined that the compressor 1 is to be stopped, the compressor 1 is stopped and the solenoid valve 6 is closed (S8). Before the compressor 1 is stopped, a pump-down is always performed is stopped and the refrigerant is stored. For the stopping of the compressor 1 at that time, stopping by low-pressure cutoff may be controlled on the basis of a pressure detected by the pressure sensor 42. When it is determined that the compressor 1 is to be stopped, the compressor 1 is stopped. To reactivate the compressor 1, the controller 50 performs the processing relating to the above-described opening and closing controlling.

[Definition of Normal Operation]

Actuating the solenoid valves 32, 31, and 6 in sequence illustrated in the flowchart in FIG. 4 can improve the activation performance in activating the compressor 1 and enables smooth shifting from the activation to a normal operation.

Advantageous Effect in Embodiment 1

As described above, the refrigeration apparatus 100 according to Embodiment 1 can achieve the control for suppressing activation with pressure difference and injection control capable of reducing failures in activating the compressor 1 and can operate continuously and smoothly from activation of the compressor 1 to a normal operation of the compressor 1. The injection control is capable of ensuring a sufficient quality of the compressor 1 during the normal operation.

Because a pump-down is performed before the compressors 1 is stopped, liquid refrigerant return in reactivating the compressors 1 can be prevented.

Embodiment 2

Figure 5:
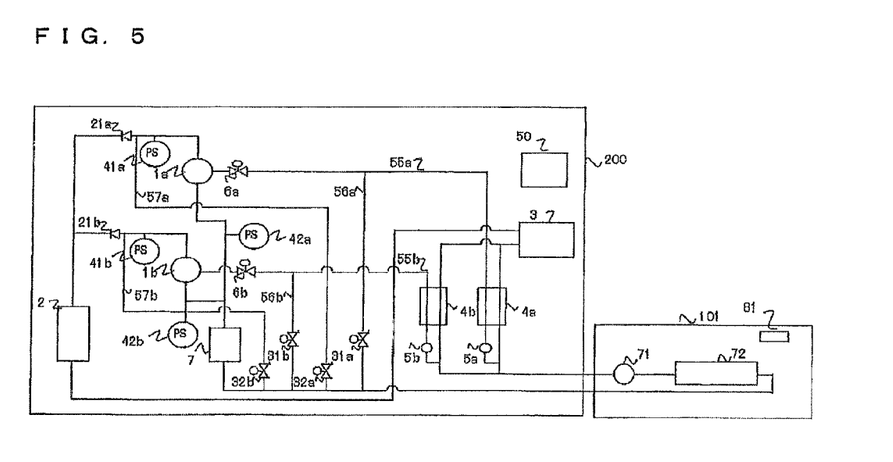
FIG. 5 is a schematic diagram that illustrates an example configuration of a refrigeration cycle apparatus including a refrigeration apparatus 200 according to Embodiment 2 of the present invention as its center.

FIG. 5 is a schematic diagram that illustrates an example configuration of a refrigeration cycle apparatus including a refrigeration apparatus 200 according to Embodiment 2 of the present invention as its center. A configuration and operations of the refrigeration apparatus 200 are described with reference to FIG. 5. The following description for the devices included in the refrigeration apparatus 200 according to Embodiment 2, operations, and the like focuses on differences from the above-described devices and operations in the refrigeration apparatus 100 according to Embodiment 1.

The refrigeration apparatus 200 according to Embodiment 2 includes two systems of the compressor 1 described in Embodiment 1, and the two systems are connected in parallel with each other in the refrigerant circuit. The two systems of the compressor 1 are referred to as compressors 1a and 1b. The refrigeration apparatus 200 includes two systems of each of the subcooling coil 4, the electronic expansion valve 5, the check valve 21, the pressure sensor 41, the pressure sensor 42, the injection circuit 55 (solenoid valve 6), the bypass circuit 56 (solenoid valve 31), and the bypass circuit 57 (solenoid valve 32). The suffixes a and b are added to the reference numerals for the two systems. The devices in the two systems can be operated in response to driving of the compressors 1a and 1b. The operations of the devices are substantially the same as the operations of the devices with the corresponding reference numerals. Here, the two systems are used, and the same applies to the cases where the refrigeration apparatus 200 includes three or more compressors 1 and thus includes three or more systems thereof.

[Control of Opening and Closing of Solenoid Valves 6, 31, and 32 in Activation and the Like of Compressor 1 in Each System]

The control of opening and closing of the solenoid valves 6a, 31a, and 32a in activating the compressor 1a and the like by the controller 50 is substantially the same as the control of opening and closing of the corresponding solenoid valves 6, 31, and 32 in Embodiment 1. The same applies to the control of opening and closing of the solenoid valves 6b, 31b, and 32b in activating the compressor 1b and the like by the controller 50.

A pump-down in the refrigeration apparatus 200 according to Embodiment 2 is described here. In Embodiment 2, the pump-down is also always performed before the compressors 1a and 1b are stopped. It is to be noted that when either one of the compressors 1a and 1b is to be stopped, the pump-down is not performed. Stopping of the compressors 1a and 1b is controlled on the basis of pressures detected by the pressure sensors 42a and 42b.

Advantageous Effect in Embodiment 2

The refrigeration apparatus 200 can achieve the injection control and the control for suppressing activation with pressure difference capable of reducing failures in activating the compressors 1a and 1b and can operate continuously and smoothly from activation of the compressors 1a and 1b to a normal operation. Because the pump-down is performed before the compressors 1 is stopped, liquid refrigerant return in reactivating the compressors 1 can be prevented.

The features are described above in two parts of Embodiments 1 and 2. The control illustrated in Embodiments 1 and 2 is control for improving the activation performance of the compressor in activating the refrigeration cycle apparatus (Embodiments 1 and 2).

Accordingly, the refrigeration cycle apparatuses according to Embodiments 1 and 2 can achieve the injection control and the control for suppressing activation with pressure difference capable of improving the activation performance of the compressor.

The above-described control patterns are merely examples. The control patterns may be changed depending on the purpose. The control patterns may be combined depending on the usage of the refrigeration cycle apparatus, the purpose of using it, and the like.

| Reference Signs List |
|---|
| 1 compressor, 1a compressor, 1b compressor, 2 condenser, 3 liquid reservoir, 4 subcooling coil, 4a subcooling coil, 4b subcooling coil, 5 electronic expansion valve, 5a electronic expansion valve, 5b electronic expansion valve, 6 solenoid valve, 6a solenoid valve, 6b solenoid valve, 7 accumulator, 21 check valve, 21a check valve, 21b check valve, 31 solenoid valve, 31a solenoid valve, 31b solenoid valve, 32 solenoid valve, 32a solenoid valve, 32b solenoid valve, 41 pressure sensor, 41a pressure sensor, 41b pressure sensor, 42 pressure sensor, 42a pressure sensor, 42b pressure sensor, 50 controller, 55 injection circuit, 55a injection circuit, 55b injection circuit, 56 bypass circuit, 56a bypass circuit, 56b bypass circuit, 57 bypass circuit, 57a bypass circuit, 57b bypass circuit, 71 expansion valve, 72 cooler, 81 temperature sensor, 100 refrigeration apparatus, 101 load side apparatus, 200 refrigeration apparatus. |

The invention claimed is:

1. A refrigeration apparatus comprising:

a compressor connected to an end of an injection pipe and capable of receiving a flow of refrigerant through the injection pipe in an intermediate section in a compression stroke and of discharging the refrigerant;

a heat source side heat exchanger configured to exchange heat between outside air and the refrigerant;

an expansion device connected by piping to another end of the injection pipe and configured to reduce a pressure of a portion of the refrigerant flowing from the heat source side heat exchanger;

a supercooling device configured to supercool the refrigerant flowing from the heat source side heat exchanger by using the refrigerant having passed through the expansion device;

a first flow opening and closing device configured to control inflowing of the refrigerant through the injection pipe into the compressor;

an injection bypass pipe connecting the injection pipe and a pipe on a suction side of the compressor;

a second flow opening and closing device configured to control passage of the refrigerant through the injection bypass pipe;

a high-low pressure bypass pipe connecting a pipe on a discharge side of the compressor and the pipe on the suction side of the compressor;

a third flow opening and closing device configured to control passage of the refrigerant through the high-low pressure bypass pipe; and a controller configured to control a frequency of the compressor and opening and closing of each of the first flow opening and closing device, the second flow opening and closing device, and the third flow opening and closing device.

2. The refrigeration apparatus of claim 1, wherein the controller is configured to exercise control of closing each of the first flow opening and closing device and the second flow opening and closing device until the compressor is activated.

3. The refrigeration apparatus of claim 2, further comprising:

a pressure detecting unit for detecting a pressure of the refrigerant on the discharge side of the compressor, wherein the controller is configured to control, on a basis of the pressure detected by the pressure detecting unit, the opening and closing of the third flow opening and closing device a predetermined time before the compressor is activated.

4. The refrigeration apparatus of claim 1, wherein the controller is configured to exercise control of closing each of the first flow opening and closing device and the third flow opening and closing device and of opening the second flow opening and closing device in activating the compressor.

5. The refrigeration apparatus of claim 4, wherein the controller is configured to determine that the compressor is in a normal operation when the frequency of the compressor is equal to or higher than a predetermined frequency after the compressor is activated.

6. The refrigeration apparatus of claim 1, wherein the controller is configured to exercise control of opening the first flow opening and closing device and of closing each of the second flow opening and closing device and the third flow opening and closing device during an operation in which the refrigerant flows into the compressor through the injection pipe.

7. The refrigeration apparatus of claim 1, wherein the controller is configured to exercise control of closing each of the first flow opening and closing device and the second flow opening and closing device and of opening the third flow opening and closing device in activating the compressor stopped by low-pressure cutoff.

8. The refrigeration apparatus of claim 1, wherein the compressor comprises one of two or more compressors connected in parallel with each other, and the injection pipe, the expansion device, the supercooling device, the first flow opening and closing device, the injection bypass pipe, the second flow opening and closing device, the high-low pressure bypass pipe, and the third flow opening and closing device are provided to each of the two or more compressors.

9. The refrigeration apparatus of claim 1, wherein the controller is configured to exercise control of changing a closed state to an opened state of each of the third flow opening and closing device, the second flow opening and closing device, and the first flow opening and closing device in an order named.

10. The refrigeration apparatus of claim 1, wherein the controller is configured to excise control of, in stopping the compressor, performing a pump-down before the compressor or each of the compressors is stopped and of, in reactivating the compressor, changing a closed state to an opened state of each of the third flow opening and closing device, the second flow opening and closing device, and the first flow opening and closing device in an order named.

11. A refrigeration cycle apparatus comprising:

a load side apparatus including a load side heat exchanger configured to exchange heat between a target for exchanging heat and a refrigerant and a flow control unit for adjusting an amount of a refrigerant flowing into the load side heat exchanger; and the refrigeration apparatus of claim 1, wherein the load side apparatus and the refrigeration apparatus are connected by pipes and constitute a refrigerant circuit.

* * * * *